United States Patent [19]

Ploss et al.

[11] Patent Number: 4,614,640

[45] Date of Patent: Sep. 30, 1986

[54] PROCESS OF PRODUCING COPPER (II) HYDROXIDE

[75] Inventors: Hartmut Ploss; Jürgen Lehne, both of Hamburg, Fed. Rep. of Germany

[73] Assignee: Norddeutsche Affinerie AG, Hamburg, Fed. Rep. of Germany

[21] Appl. No.: 736,820

[22] Filed: May 22, 1985

[30] Foreign Application Priority Data

May 23, 1984 [DE] Fed. Rep. of Germany ....... 3419089

[51] Int. Cl.⁴ ............................................. C01G 3/02
[52] U.S. Cl. ...................................... 423/35; 423/275; 423/604
[58] Field of Search .................... 423/604, 275, 27, 35; 75/117

[56] References Cited

U.S. PATENT DOCUMENTS

| | | | |
|---|---|---|---|
| 3,836,633 | 9/1974 | Beschke | 423/604 |
| 4,097,271 | 6/1978 | Swinkels et al. | 423/604 |
| 4,292,281 | 9/1981 | Chilcote et al. | 423/604 |
| 4,404,169 | 9/1983 | Ploss et al. | 423/604 |
| 4,418,056 | 11/1983 | Gonzalez | 423/604 |

FOREIGN PATENT DOCUMENTS

| | | |
|---|---|---|
| 662223 | 7/1938 | Fed. Rep. of Germany . |
| 662222 | .7/1938 | Fed. Rep. of Germany . |
| 0080227 | 11/1982 | Fed. Rep. of Germany . |
| 940030 | 12/1948 | France . |
| 442664 | 1/1936 | United Kingdom . |

OTHER PUBLICATIONS

Fiulini, Jochem Adolfo Meyer—Chemical Abstracts—vol. 99, 1983, p. 128, (99: 160785g Copper Hydroxide Preparation).

*Primary Examiner*—John Doll
*Assistant Examiner*—Robert L. Stoll
*Attorney, Agent, or Firm*—Karl F. Ross; Herbert Dubno

[57] ABSTRACT

Copper(II) hydroxide is produced by a reaction of copper oxychloride in an aqueous suspension with alkali hydroxide or alkaline earth metal hydroxide in the presence of a stabilizing agent and the product is separated and washed. To improve the stability of the copper hydroxide and to avoid a black coloring by copper oxide, inorganic silicon compounds which contain hydroxyl groups (SiOH) in the molecules or form such groups in an aqueous medium are added to the suspension. It is desirable to use particulate solid silicic acids or silicic acids which are soluble in water or colloidally dissolved.

7 Claims, No Drawings

PROCESS OF PRODUCING COPPER (II) HYDROXIDE

FIELD OF THE INVENTION

Our present invention relates to a process of producing stabilized copper(II) hydroxide i.e. $Cu(OH)_2$ from copper oxychloride by a reaction with basic substances.

BACKGROUND OF THE INVENTION

The process of producing copper(II) hydroxide from copper oxychloride known from Open German Application DE-OS 31 54 995, uses phosphate ions to ensure that the product will be stable and storable. These phosphate ions are added before the copper oxychloride suspended in an aqueous phase is reacted with alkali metal hydroxide and/or alkaline earth metal hydroxide, the precipitated copper(II) hydroxide formed by the reaction is washed and the resuspended copper(II) hydroxide is stabilized by a treatment with acid phosphate with an adjustment of a pH value between 7.5 and 9.

That process consists of a plurality of steps, at high labor and equipment cost.

For this reason it is also known to produce copper(II) hydroxide without a subsequent pH adjustment (Chem. Abstr., Vol. 99, 1983, pages 128, 160, 785 g). This process has the disadvantage that the copper(II) hydroxide product is converted at least in part to black copper(II) oxide during prolonged storage or earlier during a drying treatment.

OBJECTS OF THE INVENTION

It is the general object of our invention to provide a method of making stable $Cu(OH)_2$ which obviates the disadvantages of the prior art processes.

It is another object of the invention to provide for the production of copper(II) hydroxide from copper oxychloride a process which involves only low labor and equipment costs so that it can be carried out in a simple manner and which results in a stable, storable copper(II) hydroxide.

DESCRIPTION OF THE INVENTION

Copper(II) hydroxide is produced by a reaction of hydroxide or alkaline earth metal hydroxide in the presence of a stabilizing agent separating and washing the product. In accordance with the invention in the stabilizing agent consists of one or more inorganic silicon compounds which contain hydroxyl groups (SiOH, silanol groups) in the molecule or form such groups in an aqueous medium and is added an amount of 1 to 10% by weight of the solid copper(II) hydroxide.

By the addition of one or more of these substances in accordance with the invention a stabilization of the precipitated copper hydroxide is effected in a simple manner and even a partial conversion of the copper hydroxide to black copper(II) oxide will be avoided during a prolonged storage as a suspension and during recovery of dry copper(II) hydroxide.

Within the scope of the invention, suitable stabilizing agents include particulate solid silicic acids or silicic acids which are dissolved or colloidally dispersed in a aqueous medium. Those additives which are insoluble in water are directly added to the aqueous suspension of a freshly prepared copper oxychloride. In that case the additives are added to the copper oxychloride suspension in the reaction vessel immediately before the reaction with alkali metal hydroxide or alkaline earth metal hydroxide.

Stabilizing agents which are soluble in water or colloidally dispersible therein are suitably added to a separately prepared copper(II) hydroxide suspension immediately after the washing and filtering process.

Suitable water-insoluble inorganic silicon compounds which contain hydroxyl groups in the molecule or form such groups in an aqueous medium include pyrogenic silicic acids, such as silicic acids formed by a thermal decomposition of silicon tetrachloride in an oxyhydrogen gas flame. Such pyrogenic silicic acids generally have a particle diameter between 10 and 20 millimicrons and will improve also the physical properties of the final product, for instance, the aqueous suspensibility or wettability of the copper hydroxide. Particulate silica can similarly be used. A properly classified silica having a particle size between 10 and 80 millimicrons is preferred in that case.

In an aqueous medium, the solid silicic acids tend to take up water molecules by an addition reaction with formation of hydrogen-bond bridges so that a large proportion of SiOH groups is formed. Substances which may be used to form a stabilized copper hydroxide in the process in accordance with the invention include also the silicic acids which are soluble in water or colloidally dissolved, such as the orthosilicic acid, metasilicic acid or polysilicic acids. Suitable stabilizing agents include, e.g., silica sols or silica gels made from water-glass solutions by an addition of dilute acids. In a preferred embodiment of the invention, dissolved alkali metal silicate may be used, e.g., in the form of a water-glass solution.

As noted, in the process in accordance with the invention the inorganic silicon compounds are used in an amount equal to 1 to 10% by weight of the solid copper(II) hydroxide. In a preferred embodiment of the invention a stabilized copper(II) hydroxide is produced in a process in which the stabilizing agent is used in an amount of 2 to 5% of the solid copper(II) hydroxide.

In another desirable embodiment of the invention, a stabilizer is selected which will also improve important physical properties of the final product, such as its water suspensibility and wettability, which properties are required for various uses, particularly in agriculture for the protection of crops with copper-containing agents. Pyrogenic silicic acids are particularly suitable for that purpose.

In the process in accordance with the invention it is also necessary to take care and to ensure that the suspension of the stabilized copper(II) hydroxide product has a pH value in the range from 7.5 to 9. This is accomplished in a simple manner by washing or by addition of phosphoric acid.

The process in accordance with the invention has numerous advantages.

For instance the washing water which becomes available in the process in accordance with the invention contains virtually no substances which pollute the effluent. The mother liquor and part of the spent washing water which becomes available can be recycled and re-used to suspend the copper oxychloride employed as a starting product, although the concentration of the alkaline solution must be increased in that case from an initial value of 2 to 5 grams per liter to 4 to 10 grams per liter.

The stabilized copper(II) hydroxide produced by the process in accordance with the invention contains 45 to 61 wt.% copper. It has a particle size of 0.1 to 5 microns and its physical and chemical composition will not change even with storage over several years.

The copper(II) hydroxide produced by the process in accordance with the invention is particularly suitable for making other copper compounds, for the further processing to copper-based coloring materials and for the production of preparations for the protection of crops.

SPECIFIC EXAMPLES

The invention will be explained more in detail by the following Examples.

EXAMPLE 1

116 liters of a freshly prepared suspension of copper oxychloride having a solids content of 860 grams per liter are mixed with stirring with 3 kg pyrogenic silicic acid finely dispersed in 600 liters water. A solution of 36 kg caustic soda in 150 liters water was subsequently quickly admixed, while a reaction temperature of up to 25° C. was maintained. The reaction was completed after a few minutes; this was apparent from an intense blue color of the resulting $Cu(OH)_2$.

The resulting copper(II) hydroxide was subsequently washed with water on a rotary filter. This resulted in a decrease of the pH value to 7.5 to 9.

The product obtained could be processed further as a suspension or after having been dried to a powder. No formation of copper(II) oxide with development of a black color has noted during the storage of the liquid product or during the drying of the product.

EXAMPLE 2

The process of Example 1 was repeated but the water employed as a suspension medium for the copper oxychloride used as a starting product was replaced by the mother liquor enriched with caustic soda solution and by part of the spent washing water. The sodium chloride contained in that water had an influence only in that the concentration of the alkaline solution had to be increased from 4 g/l in Example 1 to 7 g/l.

We claim:

1. A method of producing copper(II) hydroxide which comprises reacting copper oxychloride in an aqueous suspension with a substance selected from the group consisting of alkali hydroxide and alkaline earth metal hydroxide, adding as a stabilizer agent for the copper (II) hydroxide at least one inorganic silicon compound selected from the group consisting of silicon compounds containing hydroxyl groups in their molecules and silicon compounds forming hydroxyl groups in an aqueous medium, in a quantity of 1 to 10% by weight of the solid copper (II) hydroxide formed; and recovering and washing the said copper (II) hydroxide thus formed.

2. The method defined in claim 1 wherein said silicon compound is a compound selected from the group which consists of particulate solid silicic acid, water-soluble silicic acid, and colloidally dissolved silicic acid.

3. The method defined in claim 2 wherein said silicon compound is selected from the group which consists of orthosilicic acid, metasilicic acid or polysilicic acid.

4. The method defined in claim 1 wherein said compound is particulate pyrogenic silicic acid produced by a decomposition of silicon tetrachloride.

5. The method defined in claim 1 wherein said compound is a particulate silica having a particle size of 10 to 80 millimicrons.

6. The method defined in claim 1 wherein said compound is an alkali metal silicate.

7. The method defined in claim 1 wherein said inorganic silicon compound is used in an amount of 2 to 5% by weight of the solid copper(II) hydroxide.

* * * * *